United States Patent [19]
Ellenberger

[11] Patent Number: 5,684,875
[45] Date of Patent: Nov. 4, 1997

[54] METHOD AND APPARATUS FOR DETECTING A COMPUTER VIRUS ON A COMPUTER

[76] Inventor: Hans Ellenberger, Beundenweg 33, CH-3360, Herzogenbuchsee, Switzerland

[21] Appl. No.: 327,289

[22] Filed: Oct. 21, 1994

[51] Int. Cl.$^6$ .................................. G06F 12/14
[52] U.S. Cl. ................. 380/4; 364/DIG. 1; 364/286.4
[58] Field of Search ............................. 380/4; 364/286.4

[56] References Cited

U.S. PATENT DOCUMENTS

| | | | |
|---|---|---|---|
| 5,121,345 | 6/1992 | Lentz | 364/550 |
| 5,359,659 | 10/1994 | Rosenthal | 380/4 |
| 5,475,839 | 12/1995 | Watson | 395/650 |
| 5,502,815 | 3/1996 | Cozza | 395/183.14 |

*Primary Examiner*—Gilberto Barrón, Jr.
*Attorney, Agent, or Firm*—Ryan, Maki, Mann & Hohenfeldt

[57] ABSTRACT

Methods and apparatus for detecting a computer virus on a computer, by means of repeated execution of detection algorithms to detect presence of a virus. A multitude of detection algorithms are provided, and each time the computer is checked, at least one of the algorithms is selected and executed. Even if a virus could not be detected by a few of these detection algorithms, such a virus still has only very limited chances to survive because it will be detected by another algorithm. The invention gains additional security due to at least one detection algorithm which at some suitable instant compares the total of occupied and/or free random access memory with nominal values valid at that instant. Another embodiment includes at least one detection algorithm that provides special secure disk access functions to the operating system which are not publicly documented and which require additional parameters that must match their nominal values in order to enable the function. As a further security measure, the selected virus detection algorithms can be encrypted, and only decrypted when executed in RAM, the decrypted portions immediately deleted from RAM after execution.

15 Claims, 1 Drawing Sheet

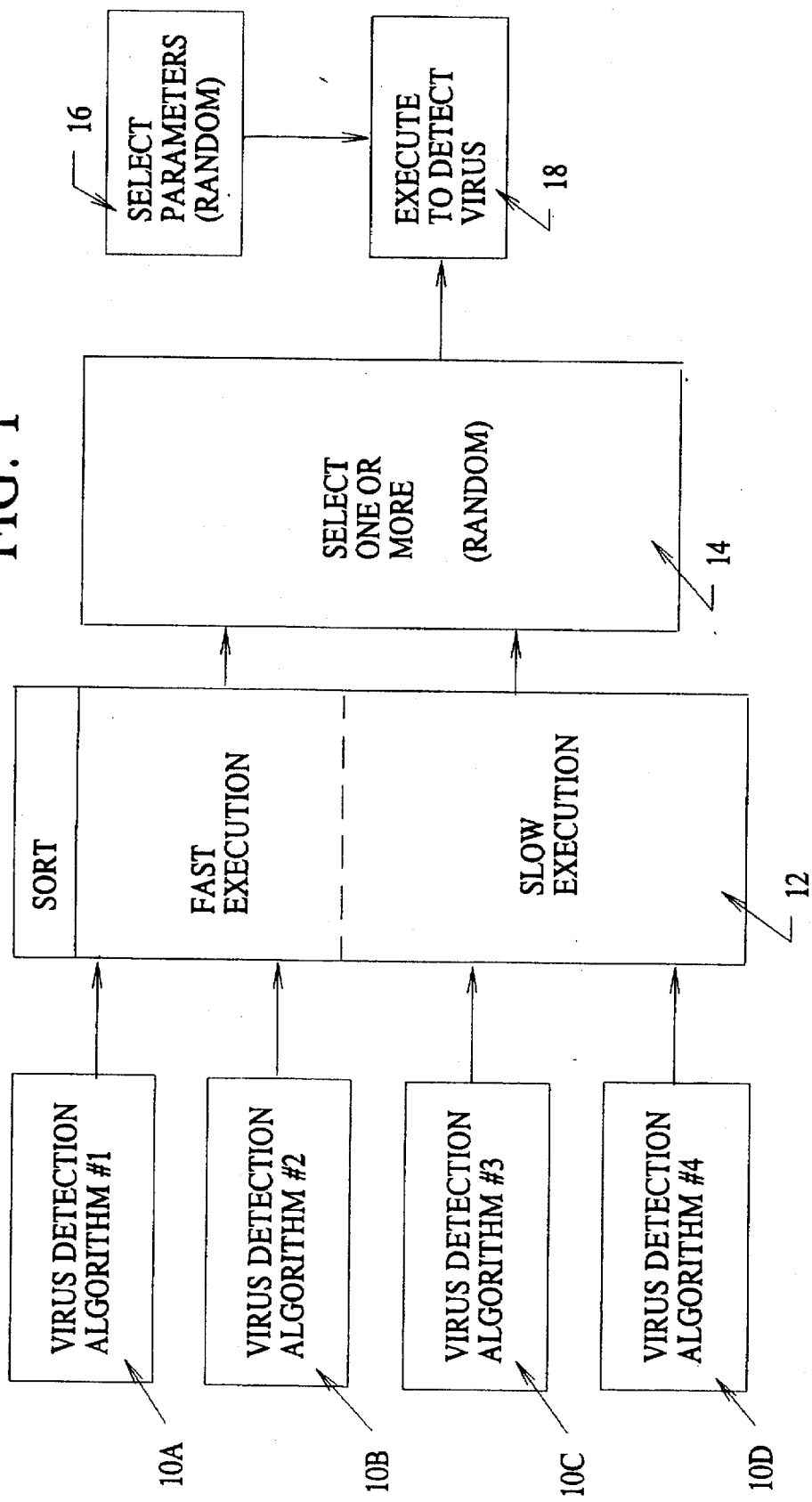

METHOD AND APPARATUS FOR DETECTING A COMPUTER VIRUS ON A COMPUTER

BACKGROUND OF THE INVENTION

This invention relates to methods and apparatus for detecting the existence of a computer virus on a computer, by repeated execution of detection algorithms. In this way the computer can be protected from any substantial damage by such a virus.

A computer virus is an executable computer program that reproduces itself by inserting its code into other computer programs, and which, under certain circumstances, perform additional, often destructive, actions. In order to prevent the undesirable activities of a computer virus, many protection schemes have been tried with unsatisfactory results. Particularly well known are the so-called scanning programs, which scan files on disk and areas of (random access) memory for suspicious sequences of code that often are characteristic of computer virus code, or for known patterns of code that are definitely used only by a virus.

There are some disadvantages of the scanning methods, however, that cannot be overcome. One such disadvantage is that the set of known virus patterns is always delayed compared to the circulation of new virus techniques. And before improved scanners are distributed worldwide, a new virus can spread without being detected. Further, a so-called polymorphous virus hides most of its code in an encrypted variation, so that scanners can only recognize the unencrypted code used to decrypt the encrypted virus code. The code used by the virus to decrypt the major part of its code is rather short, simple and can be easily coded in various variants too, so that efficient scanning is practically impossible.

On the other hand, a scanning program capable of detecting a multitude of known viruses will become unbearably slow. With thousands of virus types possible, the time required for a thorough scanning action will exceed all acceptable limits. The practical result will be that the scanning program will be run less and less often by the user, resulting in lack of security.

More thorough scanning will also increase the number of false alarms, which can annoy computer users to the point where they stop using the scanning program.

Another well known method of detecting viruses calculates so-called "fingerprints" of files containing executable programs. Such tests as cyclical redundancy checks (CRCs), or hash functions, are run, and their value compared with the value obtained from the uninfected program file.

Another type of virus is a so-called stealth virus, which can take over some actions of the operating system, such as opening a file, in order to hide the infection of that file, before other programs can read that file. These viruses cannot be detected by conventional scanning programs, and calculating fingerprints will not reveal the virus either.

This invention relates to improvements to the methods and apparatus described above and to solutions to some of the problems raised or not solved thereby.

SUMMARY OF THE INVENTION

This invention relates to methods and apparatus for preventing virus infection in a computer system. Protection against viruses should preferably be activated right when switching on the computer and/or when starting executable programs. In consideration of the damage caused by viruses, it would be desirable to include virus protection into the operating system of the computer. When a method to protect computers against virus is sufficiently wide spread, such as directly embedded into the operating system, authors of viruses will then seek workarounds by applying reverse engineering to the protection methods. The present invention hampers reverse engineering by using polymorphic protection methods.

The invention comprises methods and apparatus for protecting a computer against viruses, by means of repeated execution of detection algorithms to detect presence of a virus. A multitude of detection algorithms are provided, and each time the invention is installed on a computer, at least one of the algorithms is selected for that computer, randomly or by some other selection criteria. That particular algorithm is then executed to produce baseline or nominal values. Thereafter on that computer, until the next time the method is installed, that same algorithm continues to be used to compare current values to the nominal values, to detect any viruses. Each time the method is installed, it will be likely that a different algorithm with be selected for that particular installation. Thus, even if a virus could not be detected by a few of these detection algorithms, such a virus still has only very limited chances to survive because it will be detected by another algorithm. By this means the virus will be prevented from broad dispersal.

A sufficiently large number of detection algorithms will succeed because of the fact that a virus escaping all those detection strategies will be so enormous in size that it inevitably will be detected due to its size.

The invention gains additional security due to at least one detection algorithm which at some suitable instant compares the total of occupied and/or free random access memory with nominal values valid at that instant.

In order to detect the stealth virus referred to above, the invention may also comprise at least one detection algorithm that performs special calls of the operating system which are not publicly documented and which require additional parameters that must match their nominal values in order to enable execution of the call.

The combined application of so many different algorithms is capable of detecting all kinds of virus and will safely diminish any incentive on the part of virus developers to construct new viruses. In the past, virus developers could always create new variants not detectable by current virus scanners, always staying significantly ahead of detection capabilities, granting them considerable probability of success. When the present invention is used, on the other hand, such lead time will no longer be available. Therefore development of new viruses will be considerably less promising, and many potential virus developers will terminate such activities.

One aspect of the invention, is a method for detecting a computer virus on a computer, said computer having RAM and mass storage, and an operating system for running thereon, said method comprising: storing selected parts of a virus detection algorithm in encrypted form; decrypting the encrypted parts of the virus detection algorithm substantially immediately before executing them; executing the virus detection algorithm; deleting the decrypted parts of the virus detection algorithm substantially immediately after execution.

Another aspect of the invention is a method to detect a computer virus on a computer comprising: providing a multitude of available algorithms for detecting presence of a virus; electronically selecting at least one algorithm from said multitude of virus detection algorithms; and repeatedly checking for presence of a virus by executing at least one of said selected algorithms.

Yet another aspect of the invention is a method to detect a computer virus on a computer equipped with mass storage and memory not alterable by virus, comprising: providing a multitude of algorithms for detecting presence of a virus; electronically selecting at least one algorithm from said multitude of virus detection algorithms; and repeatedly executing at least one of said selected algorithms; at least one of the selected algorithms being of a type that, in order to read information stored in the mass storage, makes calls directly to appropriate locations of code stored in the non-alterable memory.

One embodiment of the invention is an apparatus for detecting a computer virus on a computer, said computer having RAM and disk storage, said apparatus comprising, in combination: a multitude of virus detection algorithms, available for selection, said algorithms embodied in predetermined codes; means for selecting a subset of said multitude of virus detection algorithms for execution at a particular time; means for encrypting and decrypting selected parts of the virus detection algorithm codes, so that the virus detection algorithms can be executed in RAM and immediately deleted from RAM thereafter.

Another embodiment of the invention is an apparatus for detecting a computer virus on a computer comprising, in combination: a multitude of available algorithms for detecting presence of a virus; means for electronically selecting at least one algorithm from said multitude of virus detection algorithms; and means for repeatedly executing said selected algorithms, thereby repeatedly checking for presence of virus.

Yet another embodiment of the invention is an apparatus for detecting a computer virus on a computer equipped with disk storage and non-alterable memory, comprising, in combination: a multitude of algorithms for detecting presence of a virus; means for electronically selecting at least one algorithm from said multitude of virus detection algorithms; and means for executing said selected algorithms repeatedly; at least one of the selected algorithms being of a type that, in order to read information stored on the mass storage, makes calls directly to appropriate locations of code stored in non-alterable memory.

And another aspect of the invention is a method to detect a computer virus on a computer having RAM, comprising: selecting the proper instant to examine the RAM; examining the RAM to determine a figure for one or more of: the free RAM, the occupied RAM, and the total of free and occupied RAM; and comparing the figure thus obtained to predetermined nominal values.

Finally, an aspect of the invention is a method for detecting presence or activity of a computer virus on a computer having an operating system and disk storage, comprising: providing, to the operating system, a security function which relates to writing to and reading from disk storage and which is not publicly documented, which security function requires, in order to enable execution of the function, several additional parameters each having a nominal value; selecting nominal values for each of the parameters; and thereafter always using the selected nominal values for each of the parameters when calling the function.

Other objects and advantages of the invention will become apparent hereinafter.

BRIEF DESCRIPTION OF THE DRAWINGS

FIG. 1 is a flow chart of a virus detection scheme that embodies features of the invention.

DESCRIPTION OF A PREFERRED EMBODIMENT

The present invention gains its highest level of security when the methods are tightly coupled to the operating system, or even made (an essential) part of the operating system. Placing some of the code into a non-alterable part of memory, such as EPROM or other memory that is not alterable by virus, to be executed before any alterable code gains control of the computer, further enhances security.

The following description refers to a computer equipped with the MS-DOS operating system of Microsoft Corporation, Redmond, Wash., USA. Reference to this particular operating system is for illustration only. The invention is not limited to this operating system and the following explanations can easily be adapted to other operating systems by any person reasonably skilled in the art.

A) Installation

Since an unprotected computer might already be infected by a virus, it is recommended to install the operating system onto the computer from the original distribution diskettes. It is most preferable to start by running FDISK.EXE/MBR, to write fresh code to the partition table, and to clean the all of the computer's hard disks by formatting them using FORMAT.EXE.

Installation of the operating system can be performed automatically by running an appropriate setup program that performs the following steps:

Step 1: Install the operating system files onto the boot drive. (For example, execute SYS.EXE C: so that the operating system files are copied onto the C drive, assuming that the system will be booting from drive C).

Step 2: Create a sub-directory such as C:\DOS, and copy all remaining operating system programs and data to it.

Step 3: Prepare configuration files, such as CONFIG.SYS, and startup files, such as AUTO-EXEC.BAT, to configure the installation of the system according to user's needs.

When installing the operating system from permanently write protected manufacturer's diskettes, it is quite safe to assume that they are free of viruses. When the operating system itself includes an embodiment of this invention, no further user activity is required. Otherwise the virus protection software must be installed immediately after the operating system and before any other software, by running the setup and/or installation program of the virus protection software.

During such installation a multitude of detection algorithms (see components 10A, 10B, 10C, and 10D in FIG. 1) is added to the operating system, which partly permanently reside in random access memory (RAM) and which partly reside on the computer's hard disk. Such detection algorithms may calculate CRC polynomials and hash functions, apply cryptographic methods, and use other known methods of virus detection. They calculate fingerprints of files containing executable code and other well known locations containing executable code, such as the partition table and boot sector(s), using parameters that are different for each installation.

Detection algorithms are grouped or sorted (see component 12 in FIG. 1) according to the amount of time required for their execution. That is, they may be divided for instance into algorithms that execute in less time, hereafter referred to as faster algorithms, and algorithms that take longer to execute, hereafter referred to as slower algorithms, even though the execution speed is not necessarily slower in the sense of being less efficient or not being optimized for speed of execution. Selection of individual algorithms within those groups (see component 14 in FIG. 1), and determination of their parameters, can be done at random to make sure that, with widespread use of the invention, all of the provided algorithms will be used with equal probability. The group of faster algorithms for example may use 16 bits of precision and comprise the calculation of a checksum, a hashing function or a CRC polynomial for the first 64K bytes of the file. The parameters used in connection with these faster algorithms may be the factors used in calculating the polynomial and/or a binary pattern XORed to the bytes in the file before performing the calculation. The group of slower algorithms may include algorithms similar to the fast executing group, but with higher precision, such as CRC algorithms using 32 or more bits. Or the slower algorithms can simply be algorithms applied to the whole program file regardless of its size. These algorithms may also use some of the methods described in the field of cryptography for creating so-called "signature values". The more information contained in such fingerprints or signature values, the more probable is the detection of alterations caused by virus infection.

Step 4: Select some detection algorithms of the fast group and some of the thorough, but slow executing group.

Step 5: Select at random appropriate parameters to be used by algorithms selected in step 4 (see component 16 in FIG. 1).

Step 6: Randomly select pairs of encryption and decryption algorithms used to hide important parts of the code used by the invention.

Step 7: Encrypt important parts of the security code and detection algorithms selected in step 4, applying the encryption algorithms selected in step 6, and combine them in such manner with their matching decryption algorithms that they will be automatically decrypted just before their execution and wiped out right after execution (the encrypted code will of course be kept).

Step 8: Copy all code generated according to step 7 together with other security code and data of the protection method to the hard disk. This code can reside in device driver files, executable files, overlays or other types of files, or be directly embedded into the operating system files.

If the invention were to be made a part of the MS-DOS operating system, the following steps can be adapted and executed accordingly within the code of MS-DOS. The following steps assume that the invention is installed as a separate application.

Step 9: Put as the first-executed line of the configuration file, such as C:\CONFIG.SYS, an entry for a device driver that has been partially encrypted in step 7 and written to disk in step 8.

Step 10: Insert into the startup file, such as AUTOEXEC.BAT, a line that will call a program which will perform additional testing as described below.

Step 11: Calculate nominal values of fingerprints for the detection algorithms selected in step 4 using the parameters selected in step 5 for all operating system code.

In terms of this invention, operating system code includes executable code stored with the partition table, boot sector (s), hidden operating system core files such as IO.SYS and MSDOS.SYS or IBMBIO.SYS and IBMDOS.SYS, visible operating system core files such as COMMAND.COM, and all executable files listed in the configuration files such as CONFIG.SYS and startup files such as AUTOEXEC.BAT. Nominal values of fingerprints can be stored in an encrypted file or be stored within the checked file.

Step 12: Calculate and store appropriate fingerprint values for all executable files in directory where the other operating system files are stored. The example name used above for this directory was C:\DOS.

Step 13: Jump to the code that reboots the computer in order to execute the initialization code of the device driver installed in step 9 and to make use of the resident part of its code and to execute from the startup file such as AUTOEXEC.BAT the program mentioned in step 10.

In another embodiment, the above indicated step 13 would be replaced by the following steps 13 through 15:

Step 13: Insert (or prompt the user to insert), into the diskette drive from which the computer can boot, a diskette containing special boot code in a special boot sector as described in step 14.

Step 14: Reboot the computer in order to execute the special boot code mentioned in step 13. This code reads the BIOS disk write command, which in MS-DOS is the INT 13H vector stored in four consecutive bytes in RAM beginning at address 4CH, and writes it to a safe place on that diskette and eventually to a safe location in RAM that will not be modified by any code executed until the program mentioned in step 104 is executed.

Step 15: Remove (or prompt the user to remove) that special diskette and press a key, at which time the program again reboots the computer. At this booting the hard disk is read from for the booting information, in order to make use of the resident part of the device driver and to execute from the startup file the program conducting the additional testing referred to in step 10.

B) Booting a Protected Computer

Once the invention is installed according to the steps described above, the following additional activities are executing while booting the computer. These steps are numbered starting at 101 in order to differentiate from the installation steps described above. When the operating system interprets the configuration file, such as CONFIG.SYS, the first line of that file initiates a call to the initialization code of the device driver containing the executable code and data as described above (step 9) and further detailed below.

Step 101: The operating system and BIOS disk write commands, in the example of MS-DOS the interrupt vectors of INT 21H and INT 13H respectively, are checked for plausible values. Then some resident code of the device driver performing a direct jump to the previous location of those interrupt vectors is linked in. This allows the detection algorithms to directly call the disk access functions of the operating system and the BIOS without issuing the particular commands normally required by the operating system, in this example INT 21H and INT 13H respectively, which might later by redirected by a stealth virus in order to hide infection, as described below in Section C).

Step 102: Calculate fingerprints of executable code in the partition table and boot sector(s) using one of the fast detection algorithms selected in step 4 and compare it with its nominal value of uninfected code calculated in step 11.

Step 103: When the device driver referred to before step 101 releases control, all memory except the resident part is released. The resident part of that device driver contains the aforementioned link to the interrupt functions and the secured entry points used to directly call the appropriate interrupt functions. It may also contain additional code to automatically check fingerprints of files to be loaded and/or executed and code to be executed upon creation of files that contain executable code, among other things. A multilevel strategy assures the best security while avoiding taking up too much valuable computer time.

Step 104: When the startup file is executed, its first function, mentioned in step 10, triggers execution of the detection program (see component 18 in FIG. 1), which calculates fingerprints of all remaining operating system code including the configuration file and the startup file, using one of the fast detection algorithms. These calculated fingerprints are compared with the nominal value of uninfected code calculated in step 11.

Step 105: When a computer is switched on for the first time in a day, more thorough additional tests including all device drivers called by the configuration file, and all executable program files called by the startup file, and all executable code in files stored in the operating system directory, such as the C:\DOS directory, are subject of thorough testing, which naturally takes some time. When a computer is again switched on the same day, step 105 is skipped and only limited tests requiring much less time are automatically performed.

Step 106: At some specific moment, such as at midnight for continuously running systems or at specific dates such as first day of each week or each month, additional, slow algorithms are used to check all executable code of all drives and their sub-directories of the computer system.

Due to this systematic analysis of the whole hard disk of the computer, the virus detection method might also reveal failures of disk hardware as an additional benefit. Due to the staggered testing intervals and staggered testing intensities, the method grants a high level of security without undue use of computing resources.

Should a virus try to fool all those algorithms, it first must detect all algorithms and parameters used in the computer. It then must readily incorporate methods to become invisible to all these algorithms. This is a major problem for a virus developer, necessarily resulting in very large virus code and file sizes, easily detectable by another algorithm. That is, small viruses can more easily hide within another program's code, whereas larger ones cannot.

Schedules of virus testing can be determined at the preference of the user. The user can of course conduct additional testing at any time, in case of otherwise unused computer time or at any other time.

C) Additional Considerations

When an application program wants to use the disk access services of the operating system, it should execute an conventional disk access command, such as, in MS-DOS, interrupt 21H with the register AH containing the number of the service request. Some requests will require additional parameter values in specific registers. All these details are well known to competent system programmers of MS-DOS and are extensively described in literature such as Microsoft MS-DOS Programmer's Reference ISBN 1-55615-329-5 or R. Duncan: "Advanced MS-DOS Programming" ISBN 1-55615-157-8, both of which are incorporated herein by reference in their entirety. MS-DOS itself and application programs use in a similar way other interrupt numbers, i.e. INT 13H for low level access to disk and INT 2FH for communication with other programs.

In MS-DOS the address called upon execution of a certain interrupt is held in the so-called table of interrupt vectors which can be modified by a device driver program in such a way that part of its resident code will be executed on such interrupt. The former content of the interrupt vector is usually kept somewhere in the resident data, allowing the resident code to forward selected calls to said former code. Such techniques are often used to add functionality to the operating system or to modify part of its functionality. However, it may also be abused by a stealth virus to hide itself.

The present invention also uses this technique among others to support automatic installation of new program files on disk. When additional programs are installed on a MS-DOS computer, their filenames usually have a suffix such as .COM, .EXE, .SYS, .OVL, .OVR .DLL or .BAT. When such a file is created, the installation process makes a call to the operating system, which can be caught by the resident part of the device driver, as described in step 103, and used to add fingerprint information for all programs added later to the hard disk. For executable programs with other suffixes, fingerprint information can be generated by starting a special program.

All application programs started are also tested by fast algorithms before being executed. When a program shall be loaded and eventually executed, an operating system disk access function, such as interrupt 21H in MS-DOS, is called. This call is caught by the resident part of the device driver, as described in step 103, and used to automatically calculate a new fingerprint comparing it to the nominal value of the uninfected file before executing the program. If the calculated fingerprint is not of the nominal value, this condition indicates storage of that program file by avoiding the resident part of the device driver. This condition sets off some type of notification to the user that the virus protection has been triggered, thereby enabling the user to react, and also possibly allowing security personnel to enforce guidelines on the user if necessary.

In addition to fingerprints calculated from the whole or selected parts of executable code, the length of the file and the date of its last modification can be part of extended fingerprint data structures.

There are programs which do not obey the well recognized rule of separation between code and data, such as by storing configuration data within their code. Changes of such data would trigger a false alarm. Therefore a detection algorithm is provided which ignores selected parts of the code.

When a computer is secured by the aforementioned methods, security already surpasses current state of the art without undue consumption of resources. Nevertheless, using the following additional detection algorithms might still be wise. At some suitable instant, such as during initialization of the resident device driver code as set forth above in reference to step 101, or at the beginning and the end of execution of the startup file, or when the operating system is waiting for new user input, a detection algorithm compares the amount of free and/or occupied and/or installed RAM with nominal values valid at that instant, and in case of significant deviations triggers a notification to the user. This method is well qualified to detect any viruses that may be resident in RAM.

When a stealth virus uses the function of the operating system called to open a file, in order to hide changes of virus infection, detection by previously known methods would have no success. The invention therefore also comprises methods to prevent stealth strategies of viruses by at least one detection algorithm performing direct calls of the operating system which are not publicly documented and which require additional parameters that must match their nominal values in order to enable execution of the call. Operating system calls to be secured include such disk access functions as open file, get size of file, get date of last modification, remove write protection attribute of file, and load and execute program, which are all invoked in MS-DOS by INT 21H. In MS-DOS, INT 21H can be caught by the resident part of the protection method during initialization of its device driver part. Then, when the detection algorithms require secure operation of these functions, they can call a not-publicly-known entry point of that resident code with additional parameters that verify authorization to do so. The same strategy can be used for other functions or interrupt vectors, such as INT 13H, which can be used to check the partition table and the boot sector(s). Any virus code that later on calls INT 21H, or any other protected function, to perform stealth activities, will therefore be circumvented without any chance to fool the detection algorithms.

However, under some circumstances, when the initialization of the device driver in step 101 begins, the vector of INT 13H has already been modified by MS-DOS to point somewhere into its own code. A modification done by a virus in the partition table or in the boot sector would therefore no longer be visible. When the present invention is part of the operating system, capturing the unmodified vector of INT 13H can easily be done by inserting the appropriate code within MS-DOS itself without any need for a device driver. When the present invention is not part of the operating system, the unmodified vector for INT 13H can be obtained by using a diskette with a special boot sector as described in the second embodiment of step 13. When in step 104, the protection program is started for the very first time from the startup file, it first tries to recover that information from RAM, and in case it is not available, the protection program will refer to the same information written to the special diskette and transfer that information in encrypted form to its parameter file on the hard disk. Algorithms which check special locations of the hard disk can thereafter, instead of executing INT 13H, directly call that location residing in BIOS (either EPROM or ROM), which cannot be hampered by any virus to perform stealth activities.

An admittedly unwieldy, but highly secure variant of the present invention does entirely reside on a write protected diskette and not even load any operating system by relying directly on the BIOS residing in ROM or other non-alterable memory. The code required to access specific files on the hard disk can be produced by studying the published and well documented data structures of the file system.

The effectiveness of the method and apparatus provided by this invention, which can be described as polymorphic virus detection, can best be illustrated by an example, extremely simplified for clarity, referring to currently known methods to calculate fingerprints, and strategies used by virus developers to hide their viruses. Assume that a small program to be secured consists of the code digits "01 07 09 04 02", and that the virus detection program calculates a fingerprint consisting of the total of the digits modulo 9, that is, sum all the digits, divide the total by 9, and the remainder is the fingerprint. The resulting fingerprint would then be calculated by adding the digits as follows: 1+7+9+4+2=23, yielding a fingerprint value of 5. When a short virus consisting of the code digits "05 03 08" is appended to the program to be secured, the resulting fingerprint is calculated by adding all the digits as follows: 1+7+9+4+2+5+3+8=39, with a resulting fingerprint of 3, which is different than the original fingerprint. In order to hide its existence, the virus appends a further code digit of 2, resulting in a fingerprint of 5, which again matches the original value. While the calculation of the necessary additional code digit was very elementary in this simplified example, virus developers have shown a capability to reverse engineer the fingerprints even for highly sophisticated virus detection algorithms, to thereby supply the appropriate byte sequences to cause a particular algorithm to arrive at the same fingerprint value with the inclusion of the particular developer's virus. The present invention thwarts this approach by providing a multitude of virus detection algorithms, and during installation selecting one or more of them, by random selection or by other selection criteria, for use on that individual computer. Since it is impossible for a virus developer to know beforehand which one or more of the multitude of algorithms will be used on a specific computer, to avoid detection the developer will be forced to include in the virus some code to detect what detection algorithms, and accompanying parameters, were used to calculate the fingerprints. Although theoretically possible, this approach will certainly result in virus programs huge enough to be more easily detectable by their sheer size.

All aforementioned detection methods become more secure with increasing number of different algorithms and parameters. Their discovery by virus code can further be made more difficult by encrypting those parts of code which perform functions important for maintaining security. These encrypted parts will reside in RAM as decrypted, executable code only during the short period of time while executing. Immediately thereafter, the decrypted code will be deleted from RAM, leaving only encrypted code.

Detection of eventual virus infection is the most critical part of protection, and while not always explicitly mentioned, it is understood that upon detection of virus, alarming actions including some notice to the user are triggered, and eventually repair of some type, possibly automatic, will be performed. When automatic repair is not possible, the infected program file can be deleted, or, for greater security, overwritten with constant data in order to ensure complete eradication of the virus code. The user can then reinstall the program file from uninfected diskettes, such as those from the manufacturer, which all should be permanently write protected.

While the methods hereinbefore described are effectively adapted to fulfil the aforesaid objects, it is to be understood that the invention is not intended to be limited to the specified preferred embodiment set forth above. Rather, it is to be taken as including all reasonable equivalents within the scope of the following claims.

I claim:

1. A method to detect a computer virus on a computer comprising:

provinding a multitude of available algorithms for detecting presence of a virus;

electronically selecting on a substantially random basis at least one algorithm from said multitude of virus detection algorithms; and repeatedly checking for presence of a virus by executing at least one of said selected algorithms.

2. A method as recited in claim 1 including selecting on a substantially random basis at least one detection algorithm that performs checks of at least one of the following:

any executable programs or parts thereof which are executed before an operating system program is executed on the computer;

any executable programs or parts thereof which constitute the operating system of that computer; and any executable programs or parts thereof which are not a part of the operating system of the computer.

3. A method as recited in claim 1 including selecting on a substantially random basis at least two different detection algorithms, each with randomly selected parameters, that perform checks of some or all executable code of the computer system.

4. A method as recited in claim 1 including selecting on a substantially random basis at least one detection algorithm that performs checks of at least one of the following:

the size of files containing executable programs by comparing the size of a particular file with a predetermined nominal value of the size of that particular file; and the date of last modification of files containing executable programs by comparing those dates with a predetermined nominal value of the date.

5. A method as recited in claim 1 including selecting on a substantially random basis at least one algorithm which includes:

selecting the proper instant to examine the RAM;

examining the RAM to determine a figure for one or more of: the free RAM, the occupied RAM, and the total of free and occupied RAM; and comparing the figure thus obtained to predetermined nominal values.

6. A method as recited in claim 1 including selecting on a substantially random basis at least one detection algorithm that performs special calls of the operating system which are not publicly documented and which require additional parameters that must match their predetermined nominal values in order to enable execution of the call.

7. A method as recited in claim 1 including selecting on a substantially random basis at least one detection algorithm that is stored in encrypted form and kept in RAM as an unencrypted, executable program only during its execution.

8. A method as recited in claim 2 wherein said multitude of detection algorithms can be grouped according to the amount of time required for their execution.

9. A method to detect a computer virus on a computer equipped with mass storage and memory not alterable by virus, comprising:

providing a multitude of algorithms for detecting presence of a virus;

electronically selecting on a substantially random basis at least one algorithm from said multitude of virus detection algorithms; and repeatedly executing at least one of said selected algorithms;

at least one of the selected algorithms being of a type that, in order to read information stored in the mass storage, makes calls directly to appropriate locations of code stored in the non-alterable memory.

10. A method as recited in claim 9 further comprising:

investigating the location of certain code in the non-alterable memory which performs reading and writing of the mass storage; and executing directly to the location of that code any later calls to read and write to the mass storage.

11. An apparatus for detecting a computer virus on a computer comprising, in combination:

a multitude of available algorithms for detecting presence of a virus;

means for electronically selecting on a substantially random basis at least one algorithm from said multitude of virus detection algorithms; and means for repeatedly executing said selected algorithms, thereby repeatedly checking for presence of virus.

12. A method to detect a computer virus on a computer having RAM, comprising:

selecting the proper instant to examine the RAM;

examining the RAM to determine a figure based upon one or more of the following criteria: the free RAM, the occupied RAM, and the total of free and occupied RAM, the criteria being selected on a substantially random basis: and comparing the figure thus obtained to predetermined nominal values.

13. A method to detect a computer virus on a computer comprising:

providing a multitude of available algorithms for detecting presence of a virus including a detection algorithm that is stored in encrypted form and kept in RAM as an unencrypted, executable program only during its execution;

electronically selecting according to preestablished criteria the detection algorithm from said multitude of virus detection algorithms; and repeatedly checking for presence of a virus by executing the detection algorithm.

14. A method as recited in claim 13 wherein, in the selecting step, the preestablished criteria is on a substantially random basis.

15. A method to detect a computer virus on a computer comprising:

providing a multitude of available algorithms for detecting presence of a virus, said multitude of detection algorithms being grouped according to the amount of time required for their execution, electronically selecting on a substantially random basis at least one algorithm from said multitude of virus detection algorithms; and repeatedly checking for presence of a virus by executing at least one of said selected algorithms.

* * * * *